(12) United States Patent
Satzke et al.

(10) Patent No.: US 8,209,391 B2
(45) Date of Patent: Jun. 26, 2012

(54) METHOD OF EVALUATING AN ADDITIONAL SERVICE FOR A DEVICE OF A USER OF A TELECOMMUNICATION SYSTEM

(75) Inventors: Klaus Satzke, Tamm (DE); Stefan Wahl, Schwieberdingen (DE)

(73) Assignee: Alcatel Lucent, Paris (FR)

( * ) Notice: Subject to any disclaimer, the term of this patent is extended or adjusted under 35 U.S.C. 154(b) by 678 days.

(21) Appl. No.: 11/544,581

(22) Filed: Oct. 10, 2006

(65) Prior Publication Data

US 2007/0083605 A1    Apr. 12, 2007

(30) Foreign Application Priority Data

Oct. 11, 2005    (EP) ..................................... 05292118

(51) Int. Cl.
*G06F 15/16*    (2006.01)

(52) U.S. Cl. .......................... 709/207; 709/217; 709/229

(58) Field of Classification Search .................. 370/465; 455/418, 419; 709/227, 229
See application file for complete search history.

(56) References Cited

U.S. PATENT DOCUMENTS

| | | | |
|---|---|---|---|
| 6,295,447 B1 * | 9/2001 | Reichelt et al. ............... 455/417 |
| 7,299,304 B2 * | 11/2007 | Saint-Hilaire et al. .......... 710/11 |
| 2003/0065788 A1 * | 4/2003 | Salomaki ...................... 709/227 |
| 2003/0073440 A1 * | 4/2003 | Mukherjee et al. ............ 455/435 |
| 2003/0229900 A1 * | 12/2003 | Reisman ......................... 725/87 |
| 2004/0128394 A1 * | 7/2004 | Knauerhase et al. .......... 709/229 |
| 2004/0198379 A1 * | 10/2004 | Magee et al. ............... 455/456.1 |
| 2006/0047668 A1 * | 3/2006 | Kang ............................... 707/10 |
| 2006/0224688 A1 * | 10/2006 | Morris .......................... 709/217 |

* cited by examiner

*Primary Examiner* — Brandon Renner
(74) *Attorney, Agent, or Firm* — Fay Sharpe LLP

(57) ABSTRACT

A method of evaluating an additional service for a device (11) of a user of a telecommunication system is described. The device (11) supports one or more basic services. The kind of basic service/s being provided by the device (11) is examined. An additional service that could be combined with the basic service/s already supported by the device (11) is searched.

12 Claims, 1 Drawing Sheet

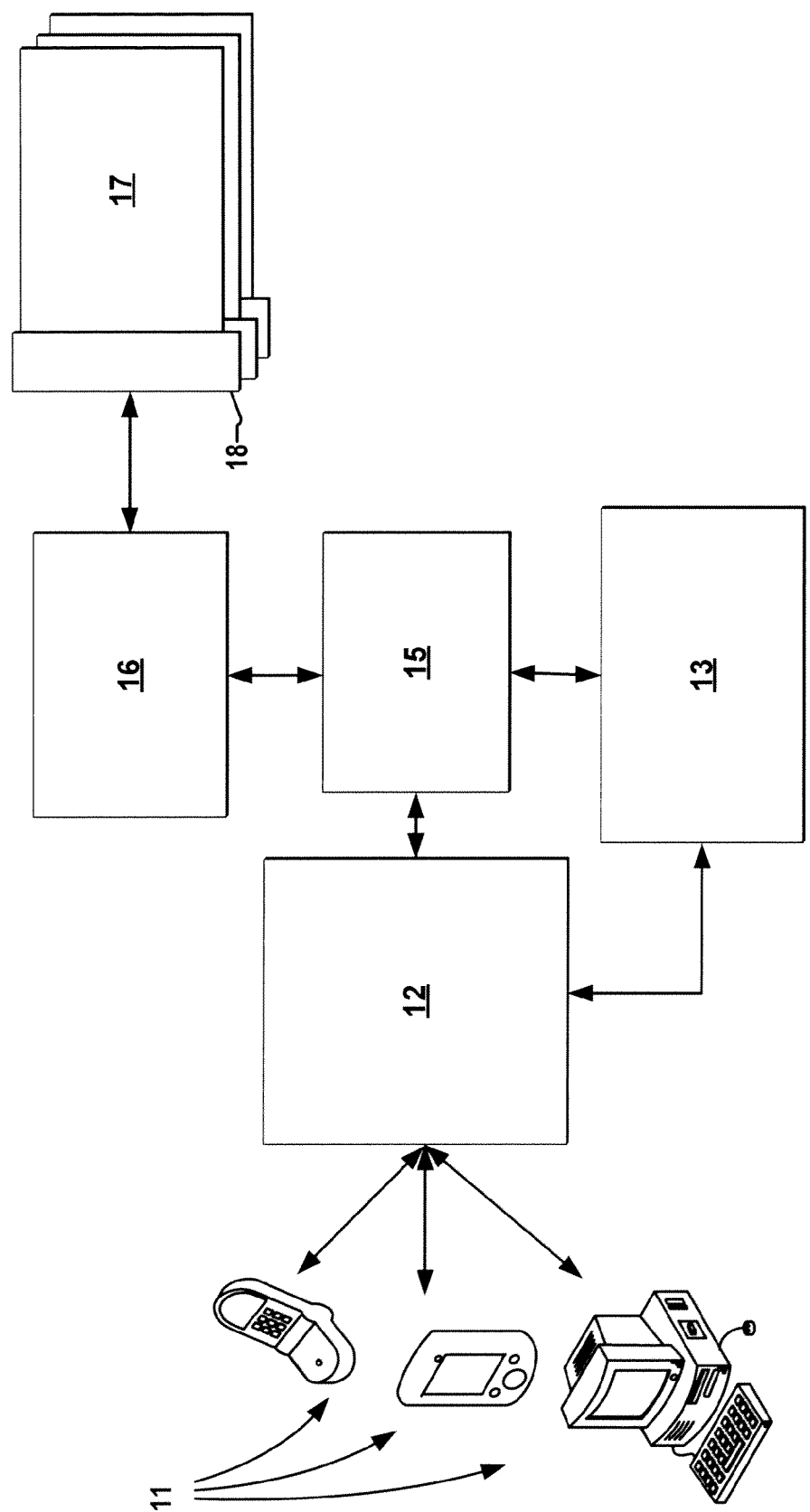

METHOD OF EVALUATING AN ADDITIONAL SERVICE FOR A DEVICE OF A USER OF A TELECOMMUNICATION SYSTEM The invention is based on a priority application EP 05 292 118.6 which is hereby incorporated by reference.

TECHNICAL FIELD

The present invention relates to a method of evaluating an additional service for a device of a user of a telecommunication system wherein the device supports one or more basic services. Furthermore, the invention relates to a service extension module, a presence server and a telecommunication system.

BACKGROUND OF THE INVENTION

In order to increase the reachability of an employee at work, it is known to offer presence information concerning the employee to others.

In general, presence information relates to the actual activity of a user, i.e. whether he/she is in the office or on the phone or in a meeting or the like. Furthermore, presence provides information on those devices and applications on which the user actually can be reached, i.e. those services that are supported by the devices of the user. For example, the devices of the user support speech based services, e.g. phone and/or text based services, e.g. facsimile and/or Short Message Service (SMS) and/or email. This presence information may then be used by a requesting person, e.g. by a caller, to reach the user more effectively.

With regard to the actual activity of the user, the generated presence information is stored in a database of the presence server and published to a registered person on request. Concerning the devices on which the user actually may be reached, it is often necessary that the user manually updates their status so that the new status may then be stored in the database of the presence server.

These known methods may lead to a situation e.g. that a caller wants to reach a user by a specific service, for example by MMS, but the devices of the user are not adapted to correctly display the MMS from the caller e.g. due to different resolutions of the transmitted picture.

SUMMARY OF THE INVENTION

It is an object of the invention to overcome the deficiencies of the prior art and to increase the reachability of the user.

The invention solves this object by the steps of examining the kind of basic service/s being provided by the device, and searching for an additional service that could be combined with the basic service/s already supported by the device. Furthermore, the invention solves this object by a service extension module, a presence server and a telecommunication system.

In a first step, the invention evaluates those basic services that are already supported by the device. Based on these evaluations, the invention searches in a second step for an additional service that could be combined with the basic service/s already supported by the device.

As an example, the invention recognizes in the first step that the device of the user is able to display pictures with first resolution. Then, as a result of the second step, the invention finds an additional service that is capable of converting a picture with a second resolution into a picture with the first resolution. Consequently, this additional service could be combined with the supported basic service.

The invention provides the advantage that a user is able to receive e.g. a MMS with a certain resolution although the device of the user is not capable to display this resolution by its own. The reachability of the user, therefore, is increased.

The invention, therefore, provides a method of evaluating, identifying and integrating additional services for a device of a user of a telecommunication system. The device by itself supports one or more basic services. The totality of basic services being provided by the device is evaluated. One or more additional services that extend the basic service/s supported by the device by itself, are then identified and integrated into the user's service offer.

In an advantageous embodiment of the invention, the basic service/s and the additional service are used as presence information of the user. As a result, the user cannot only be reached via the basic services that are supported by the device of the user as such, but also via the additional service. Furthermore, these possibilities to reach the user are comprised in the presence information of the user and may therefore be used by a caller.

In particular, the basic services that are supported by the device of the user as such, as well as the additional service are stored in a database. The additional service is added to the database together with an identification code for its access. The totality of the user's services may then be provided to a requesting person that wants to communicate with the user.

Further features, applications and advantages of the invention will become apparent from the following description of exemplary embodiments of the invention that are shown in the drawing. There, all described and shown features separately or in any combination represent the subject matter of the invention, independently of the wording in the description or the representation in the drawing and independently of the combination in the claims or the dependencies of the claims.

BRIEF DESCRIPTION OF THE DRAWINGS

FIG. 1 shows a schematic block diagram of an embodiment of a method of evaluating an additional service for a device of a user of a telecommunication system according to the invention.

DETAILED DESCRIPTION OF PREFERRED EMBODIMENTS

In FIG. 1, three examples of devices 11 are shown that may be used by a user to communicate with others. The shown devices 11 are a mobile phone, a personal digital assistant (PDA) and a personal computer (PC). Depending on the respective user, not all of the devices 11 must be present or other or additional devices may be present. It is assumed that all devices 11 are coupled to a telecommunication system, e.g. by a radio link or a wired link. Furthermore, it is assumed that it is possible to communicate with each one of the devices 11 based on a speech based and/or text based service.

Using one or more given identities of the devices 11, it is possible that a requesting person builds up a communication with the devices 11 of the user using a speech based or a text based service. For example, the requesting person may call the user on the mobile phone or may send an email to the PDA or the PC of the user.

A user device assistant 12 is provided that is coupled with the devices 11 of the user and that is able to check these devices 11 at least from time to time. In particular, the user device assistant 12 evaluates the actual status of the devices 11 of the user, in particular which kind of devices 11 are actually present and which kind of basic services are actually supported by these devices 11.

As an example, the user device assistant 12 determines that the mobile phone, the PDA and the PC of the user are actually active, i.e. switched on, and that these devices 11 of the user are able to support voice calls, messages using the Simple Message Service (SMS), messages using the Multimedia Message Service (MMS) and emails.

The results of the evaluations of the user device assistant 12 are forwarded to a presence server 13 and are then stored as presence information of the user in a database of the presence server 13. In this database, therefore, among others all those basic services are stored that are supported by the devices 11 of the user.

A service extension module 15 is provided that also receives the results of the evaluations of the user device assistant 12. The service extension module 15 evaluates whether it is possible to add one or more additional services to those basic services already provided by the devices 11 of the user.

For that purpose, the service extension module 15 is capable to access a Web Services directory 16, for example the Universal Description, Discovery and Integration (UDDI) directory. The service extension module 15 searches the Web Services directory 16 for Web Services 17 that could be combined with one of the already existing basic services of the devices 11 of the user.

As an example, the service extension module 15 could select one of the Web Services 17 from the Web Services directory 16 that provides a conversion from SMS to speech or from email to speech. Using this Web Service 17, it would be possible to extend the presence information of an user to SMS and email services even if the devices 11 of the user only comprise a so-called POTS phone (POTS=plain old telephone system) for voice based services only. In this case, an SMS or an email would be converted by the selected Web Service 17 and would then be forwarded as a voice call to the POTS phone of the user.

Another example could relate to the transmission of MMS from a first mobile phone with a resolution A of the picture to be transmitted, to a second mobile phone with a resolution B that is different from the resolution A. In this case, the service extension module 15 could select one of the Web Services 17 from the Web Services directory 16 that provides a conversion from a MMS generated in resolution A into a MMS with resolution B. Using this Web Service 17, it would be possible to extend the presence information of a user to MMS with different resolutions. As a result, a MMS that is sent by the first mobile phone, i.e. the caller's mobile phone, with the resolution A would be converted by the selected Web Service 17 and would then be displayed on the second mobile phone, i.e. on the mobile phone of the called person, with the resolution B.

The Web Services 17 may be present in the Internet. For example, the Web Services Description Language (WSDL) may be used for the description of the Web Services 17. In order to access the Web Services 17, for example the Simple Object Access Protocol (SOAP) may be used. These possibilities are expressed in FIG. 1 by the reference numeral 18.

If the service extension module 15 finds out that it is possible to add one or more additional services to the basic services already provided by the devices 11 of the user, then the service extension module 15 forwards an identification of the additional Web Service/s to the presence server 13. In particular, if the service extension module 15 finds a Web Service 17 that could be added to the basic services already provided by the devices 11 of the user, then the service extension module 15 forwards an identification code, e.g. a Unified Resource Identifier (URI) of this Web Service 17, to the presence server 13.

The presence server 13 then adds this additional service to the presence information being stored in the database of the presence server 13. The presence information in this database, therefore, does not only comprise the basic services that the devices 11 of the user actually support. In addition, the presence information of the user in this database also comprises additional services that the devices 11 of the user do not support as such, but that are provided by the Web Services 17.

The totality of presence information of the database of the presence server 13 may be displayed to a requesting person that wants to contact the respective user. Then, the requesting person is able to use all services that are provided as the presence information of the user, i.e. the basic services and the additional services. Compared to the services provided by the devices 11 of the user as such, the requesting person, therefore, is able to also use those services being provided by the Web Services 17.

For example, it is assumed that the user has a mobile phone with a resolution A of the picture to be transmitted by a MMS service, and that the requesting person has a mobile phone with a resolution B. Furthermore, it is assumed that a Web Service 17 was found by the service extension module 15 that is able to convert a MMS from resolution B to resolution A, and that this Web Service 17 was added to the presence information of the user according to the above description. If, then, the requesting person sends a MMS to the user, this MMS is forwarded to the respective Web Service 17 based on the identification code, e.g. the URI stored in the database of the presence server 13. The Web Service 17 converts the MMS from resolution B to resolution A and the converted MMS can then be displayed on the mobile phone of the user.

In another example, it is assumed that the user only has a POTS phone and that the requesting person wants to send an SMS to the user. Furthermore, it is assumed that a Web Service 17 was found by the service extension module 15 that is able to convert a text based SMS into a speech based phone call, and that this Web Service 17 was added to the presence information of the user according to the above description. If, then, the requesting person sends an SMS to the user, this SMS is forwarded to the respective Web Service 17 based on the identification, e.g. the URI stored in the database of the presence server 13. The Web Service 17 converts the SMS into a speech based service and forwards this speech based service to the POTS phone of the user. The user may then listen to the speech based service that announces the SMS sent by the requesting person.

The invention claimed is:

1. A telecommunications system comprising:
a user device assistant processor operatively coupled with at least one user device to identify basic services provided by the user device, and to evaluate capabilities of the basic services and the user device;
a service extension processor operative to:
receive evaluation results from the user device assistant processor indicating the basic services provided by the user device and the capabilities of the basic services and the user device,
evaluate whether it is possible to add one or more additional services to the basic services provided by the user device according to the evaluation results received from the user device assistant processor, and
search a Web services directory for an additional Web Service that can be combined with at least one of the basic services of the user device according to the evaluation results received from the user device assistant processor in order to extend the capabilities of the user device; and a presence server operatively coupled with the service extension processor to receive an identification code representing the additional Web Service forwarded by the service extension processor, the presence server comprising a database storing presence information including the basic services provided by the user device, the presence server being operative to:

store the basic services provided by the user device in the presence information for the user device, store the identification code representing the additional Web Service forwarded by the service extension processor in the presence information for the user device, display the presence information for the user device to a requesting caller that wants to contact a user of the user device, including the basic services of the user device and the additional Web Service to be requested by the requesting caller, and if the additional Web Service is requested by a message from the requesting caller, to forward the message to the additional Web Service according to the identification code in the presence information for the user device for conversion by the additional Web service of the message by changing a format of a text, speech, picture, or multimedia portion of the message using the additional Web Service to meet the capabilities of the user device, and transmit the converted message to the user device.

2. The telecommunications system of claim 1, wherein the additional Web Service is operative to convert the message by changing a multimedia portion of the message to a different resolution to meet the capabilities of the user device.

3. The telecommunications system of claim 1, wherein the additional Web Service is operative to convert the message by changing a picture portion of the message to a different resolution to meet the capabilities of the user device.

4. The telecommunications system of claim 1, wherein the additional Web Service is operative to convert the message by one of changing a text portion of the message to a speech format and changing a speech portion of the message to a text format.

5. The telecommunications system of claim 4, wherein the additional Web Service is operative to convert the message by one of changing a text portion of an email portion of the message to a speech format and changing a speech portion of the message to an email format.

6. The telecommunications system of claim 4, wherein the additional Web Service is operative to convert the message by one of changing a text portion of an SMS portion of the message to a speech format and changing a speech portion of the message to an SMS format.

7. A method for extending services provided by a user device in a telecommunications system, the method comprising:

identifying basic services provided by the user device;

evaluating capabilities of the basic services and the user device;

evaluating whether it is possible to add one or more additional services to the basic services provided by the user device;

searching a Web services directory for an additional Web Service that can be combined with at least one of the basic services of the user device to extend the capabilities of the user device;

storing presence information including the basic services provided by the user device and an identification code representing the additional Web Service;

displaying the presence information for the user device to a requesting caller that wants to contact a user of the user device, including the basic services of the user device and the additional Web Service to be requested by the requesting caller, and receiving a message from the requesting caller that requests the additional Web Service;

forwarding the message to the additional Web Service according to the identification code in the presence information for the user device;

converting the message by changing a format of a text, speech, picture, or multimedia portion of the message using the additional Web Service to meet the capabilities of the user device; and transmitting the converted message to the user device.

8. The method of claim 7, wherein converting the message comprises changing a multimedia portion of the message to a different resolution using the additional Web Service to meet the capabilities of the user device.

9. The method of claim 7, wherein converting the message comprises changing a picture portion of the message to a different resolution using the additional Web Service to meet the capabilities of the user device.

10. The method of claim 7, wherein converting the message comprises one of changing a text portion of the message to a speech format and changing a speech portion of the message to a text format.

11. The method of claim 10, wherein converting the message comprises one of changing a text portion of an email portion of the message to a speech format and changing a speech portion of the message to an email format.

12. The method of claim 10, wherein converting the message comprises one of changing a text portion of an SMS portion of the message to a speech format and changing a speech portion of the message to an SMS format.

* * * * *